(12) United States Patent
Nagata et al.

(10) Patent No.: US 7,825,178 B2
(45) Date of Patent: Nov. 2, 2010

(54) LEVELING AGENT FOR FLOOR POLISH AND AQUEOUS FLOOR POLISH COMPOSITION

(75) Inventors: Atsushi Nagata, Ibaraki (JP); Yasunori Fujita, Kyoto (JP)

(73) Assignee: Daihachi Chemical Industry Co., Ltd., Osaka-shi (JP)

( * ) Notice: Subject to any disclaimer, the term of this patent is extended or adjusted under 35 U.S.C. 154(b) by 618 days.

(21) Appl. No.: 11/665,609

(22) PCT Filed: Oct. 14, 2005

(86) PCT No.: PCT/JP2005/018939

§ 371 (c)(1),
(2), (4) Date: Apr. 18, 2007

(87) PCT Pub. No.: WO2006/043475

PCT Pub. Date: Apr. 27, 2006

(65) Prior Publication Data

US 2007/0289481 A1    Dec. 20, 2007

(30) Foreign Application Priority Data

Oct. 20, 2004    (JP) .............................. 2004-305240

(51) Int. Cl.
*C09G 1/02*    (2006.01)
*C08K 5/10*    (2006.01)
(52) U.S. Cl. ........................... 524/317; 106/3; 427/256; 524/284; 524/306; 524/310; 524/311; 524/314
(58) Field of Classification Search ................. 524/284, 524/306, 310, 311, 317, 314; 427/256; 106/3; 554/121; 560/182, 185
See application file for complete search history.

(56) References Cited

U.S. PATENT DOCUMENTS

| | | | | |
|---|---|---|---|---|
| 2,046,150 | A | * 6/1936 | Cox et al. | .................... 560/182 |
| 3,353,971 | A | * 11/1967 | Savage et al. | ................... 106/5 |
| 4,131,585 | A | 12/1978 | Feigin | |
| 5,521,267 | A | * 5/1996 | Giencke et al. | ............. 526/201 |
| 5,556,905 | A | 9/1996 | Frappier | |

FOREIGN PATENT DOCUMENTS

| | | |
|---|---|---|
| CN | 1056114 A | 11/1991 |
| EP | 0122788 | 10/1984 |
| JP | 63086753 | 4/1988 |
| WO | 91/17136 A1 | 11/1991 |

OTHER PUBLICATIONS

Chinese Office Action with Translation dated Jun. 5, 2009, issued in corresponding Chinese Patent Application No. 200580035749.9
European Search Report dated Jun. 12, 2008; Application No. 05793226.1-2102.
International Search Report for PCT/JP2005/018939 mailed on Dec. 27, 2005.
International Search Report of PCT/JP2005/018939, dated of mailing Nov. 28, 2005.

* cited by examiner

*Primary Examiner*—David Wu
*Assistant Examiner*—Marie Reddick
(74) *Attorney, Agent, or Firm*—Westerman, Hattori, Daniels & Adrian, LLP

(57) ABSTRACT

A floor-polish leveling agent containing an ester compound obtained by reacting a hydroxycarboxylic acid with at least one glycol ether so that substantially all of the carboxyl groups are esterified. The ester compound may be an acetylated ester compound in which one or more hydroxyl groups are acetylated. An aqueous floor-polish composition containing this ester compound and/or acetylated ester compound, and a water-insoluble polymer.

12 Claims, No Drawings

LEVELING AGENT FOR FLOOR POLISH AND AQUEOUS FLOOR POLISH COMPOSITION

TECHNICAL FIELD

The present invention relates to an aqueous floor-polish composition used to protect floor surfaces and impart gloss, the floor surfaces being made of chemical floor materials containing synthetic resins such as vinyl resins, wood floor materials, stone/cement floor materials such as concrete and marble, etc.

BACKGROUND ART

Floor-polish compositions usually contain a leveling agent, which is an additive used to suppress surface defects. The use of an aliphatic compound as a leveling agent has been desired from the viewpoint of environmental protection in recent years.

For example, JP 6-80933 A discloses a floor-polish composition comprising an adipate ester as a leveling agent. However, the composition disclosed therein does not have a satisfactory leveling property nor does it provide a uniform gloss. Furthermore, this composition is inferior in terms of water resistance, detergent resistance and durability.

JP 59-206476 A discloses a floor-polish composition comprising a polyalkoxylated straight chain aliphatic alcohol as a leveling agent. JP 6-33016 A discloses a floor-polish composition comprising a polyethoxylated aliphatic secondary alcohol as a leveling agent. However, these compositions are inferior in terms of their leveling property and adhesion to floor surfaces, and also have an insufficient ability to form coating films at low temperatures. Furthermore, due to the poor compatibility of the leveling agent with the water-insoluble polymer used as a polishing component, these compositions have another problem in that, when applied to a floor surface and dried, the leveling agent bleeds onto the surface of the coating film.

JP 2003-73628 A discloses a floor-polish composition comprising as a leveling agent a citric acid alkyl ester not containing an ether bond. JP 2003-160763 A discloses a technique of using ester alcohols having no ether bonds, such as texanol. However, these compositions also have an insufficient leveling property and are unsatisfactory for practical use.

DISCLOSURE OF INVENTION

Problem to be Solved by the Invention

An object of the present invention is to provide a leveling agent for floor-polish compositions that has a satisfactory leveling property for practical use, and an aqueous floor-polish composition having a satisfactory leveling property for practical use.

Means for Solving the Problem

To solve the above problem, the present inventors carried out extensive research and found that when using as a leveling agent an ester compound obtained by reacting a hydroxycarboxylic acid with at least one glycol ether so that substantially all of the carboxyl groups are esterified, a floor-polish composition satisfactory for practical use can be obtained.

The present inventors also found that an acetylated ester compound prepared by acetylating one or more hydroxyl groups of the above ester compound can also exhibit excellent effects as a leveling agent as with the unacetylated ester. The present invention has been accomplished based on the above findings.

Thus the present invention provides the following floor-polish leveling agents and aqueous floor-polish compositions.

1. A floor-polish leveling agent comprising an ester compound obtained by reacting a hydroxycarboxylic acid with at least one glycol ether so that substantially all of the carboxyl groups are esterified.

2. The leveling agent according to item 1 wherein the hydroxycarboxylic acid is a compound represented by formula (1):

$$C_aH_b(COOH)_m(OH)_n \qquad (1)$$

wherein a is an integer from 1 to 6, m is an integer from 1 to 3, n is an integer from 1 to 3, and b is an integer satisfying $2a+2=b+m+n$.

3. The leveling agent according to item 1 wherein the hydroxycarboxylic acid is a compound selected from the group consisting of citric acid, malic acid, lactic acid, and tartaric acid.

4. The leveling agent according to any one of items 1 to 3 wherein the glycol ether is a compound represented by formula (2):

$$R^1O(R^2O)_pH \qquad (2)$$

wherein $R^1$ is a $C_{1-8}$ straight chain or branched alkyl group, or a $C_{6-12}$ aryl group, $R^2$ is a $C_{2-4}$ straight chain or branched alkylene group, and p is an integer from 1 to 4.

5. The leveling agent according to item 4 wherein the glycol ether is a compound of formula (2) wherein $R^1$ is a $C_{1-4}$ straight chain or branched alkyl group, $R^2$ is a $C_{2-4}$ straight chain or branched alkylene group, and p is an integer from 1 to 4.

6. A floor-polish leveling agent comprising an acetylated ester compound shown in (a) or (b) below:

(a) an acetylated ester compound obtained by acetylating one or more hydroxyl groups of a hydroxycarboxylic acid and reacting the acetylated compound with at least one glycol ether so that substantially all of the carboxyl groups are esterified;

(b) an acetylated ester compound obtained by reacting a hydroxycarboxylic acid with at least one glycol ether so that substantially all of the carboxyl groups are esterified and then acetylating one or more hydroxyl groups of the esterified compound.

7. The leveling agent according to item 6 wherein the hydroxycarboxylic acid is a compound represented by formula (1):

$$C_aH_b(COOH)_m(OH)_n \qquad (1)$$

wherein a is an integer from 1 to 6, m is an integer from 1 to 3, n is an integer from 1 to 3, and b is an integer satisfying $2a+2=b+m+n$.

8. The leveling agent according to item 6 wherein the hydroxycarboxylic acid is a compound selected from the group consisting of citric acid, malic acid, lactic acid, and tartaric acid.

9. The leveling agent according to any one of items 6 to 8 wherein the glycol ether is a compound represented by formula (2):

$$R^1O(R^2O)_pH \qquad (2)$$

wherein R¹ is a $C_{1-8}$ straight chain or branched alkyl group, or a $C_{6-12}$ aryl group, R² is a $C_{2-4}$ straight chain or branched alkylene group, and p is an integer from 1 to 4.

10. The leveling agent according to item 9 wherein the glycol ether is a compound of formula (2) wherein R¹ is a $C_{1-4}$ straight chain or branched alkyl group, R² is a $C_{2-4}$ straight chain or branched alkylene group, and p is an integer from 1 to 4.

11. An aqueous floor-polish composition comprising a water-insoluble polymer and at least one compound selected from the group consisting of ester compounds obtained by reacting a hydroxycarboxylic acid with at least one glycol ether so that substantially all of the carboxyl groups are esterified, and acetylated ester compounds shown in (a) and (b) below:

(a) acetylated ester compounds obtained by acetylating one or more hydroxyl groups of a hydroxycarboxylic acid and reacting the acetylated compound with at least one glycol ether so that substantially all of the carboxyl groups are esterified;

(b) acetylated ester compounds obtained by reacting a hydroxycarboxylic acid with at least one glycol ether so that substantially all of the carboxyl groups are esterified and then acetylating one or more hydroxyl groups of the esterified compound.

12. The composition according to item 11 wherein the hydroxycarboxylic acid is a compound represented by formula (1):

$$C_aH_b(COOH)_m(OH)_n \quad (1)$$

wherein a is an integer from 1 to 6, m is an integer from 1 to 3, n is an integer from 1 to 3, and b is an integer satisfying 2a+2=b+m+n.

13. The composition according to item 11 wherein the hydroxycarboxylic acid is a compound selected from the group consisting of citric acid, malic acid, lactic acid, and tartaric acid.

14. The composition according to any one of items 11 to 13 wherein the glycol ether is a compound represented by formula (2):

$$R^1O(R^2O)_pH \quad (2)$$

wherein R¹ is a $C_{1-8}$ straight chain or branched alkyl group, or a $C_{6-12}$ aryl group, R² is a $C_{2-4}$ straight chain or branched alkylene group, and p is an integer from 1 to 4.

15. The composition according to item 14 wherein the glycol ether is a compound of formula (2) wherein R¹ is a $C_{1-4}$ straight chain or branched alkyl group, R² is a $C_{2-4}$ straight chain or branched alkylene group, and p is an integer from 1 to 4.

16. The composition according to any one of items 11 to 15 containing 0.005 to 20 wt. % of at least one compound selected from the group consisting of the above ester compounds and acetylated ester compounds per 100 wt. % of the composition.

17. The composition according to any one of items 11 to 16 wherein the water-insoluble polymer is at least one polymer selected from the group consisting of polymers of ethylenic unsaturated bond-containing monomers, copolymers thereof, and urethane polymers.

18. The composition according to item 17 wherein the water-insoluble polymer is at least one polymer selected from the group consisting of acrylic polymers, styrene-acrylic polymers, urethane polymers, and urethane-acrylic polymers.

19. The composition according to item 17 wherein the water-insoluble polymer is at least one polymer selected from the group consisting of styrene-acrylic polymers, and acrylic polymers.

20. The composition according to any one of items 11 to 19 containing 1 to 50 wt. % of the water-insoluble polymer per 100 wt. % of the composition.

21. Use of an ester compound as a floor-polish leveling agent, the ester compound being obtained by reacting a hydroxycarboxylic acid with at least one glycol ether so that substantially all of the carboxyl groups are esterified.

22. Use of an acetylated ester compound shown in (a) or (b) below as a floor-polish leveling agent:

(a) an acetylated ester compound obtained by acetylating one or more hydroxyl groups of a hydroxycarboxylic acid and reacting the acetylated compound with at least one glycol ether so that substantially all of the carboxyl groups are esterified;

(b) an acetylated ester compound obtained by reacting a hydroxycarboxylic acid with at least one glycol ether so that substantially all of the carboxyl groups are esterified and then acetylating one or more hydroxyl groups of the esterified compound.

23. Use of an ester compound to produce a floor-polish leveling agent, the ester compound being obtained by reacting a hydroxycarboxylic acid with at least one glycol ether so that substantially all of the carboxyl groups are esterified.

24. Use of an acetylated ester compound shown in (a) or (b) below to produce a floor-polish leveling agent:

(a) an acetylated ester compound obtained by acetylating one or more hydroxyl groups of a hydroxycarboxylic acid and reacting the acetylated compound with at least one glycol ether so that substantially all of the carboxyl groups are esterified;

(b) an acetylated ester compound obtained by reacting a hydroxycarboxylic acid with at least one glycol ether so that substantially all of the carboxyl groups are esterified and then acetylating one or more hydroxyl groups of the esterified compound.

25. A method of producing an aqueous floor-polish composition comprising mixing a water-insoluble polymer-containing component with at least one compound selected from the group consisting of ester compounds obtained by reacting a hydroxycarboxylic acid with at least one glycol ether so that substantially all of the carboxyl groups are esterified, and acetylated ester compounds shown in (a) and (b) below:

(a) acetylated ester compounds obtained by acetylating one or more hydroxyl groups of a hydroxycarboxylic acid and reacting the acetylated compound with at least one glycol ether so that substantially all of the carboxyl groups are esterified;

(b) acetylated ester compounds obtained by reacting a hydroxycarboxylic acid with at least one glycol ether so that substantially all of the carboxyl groups are esterified and then acetylating one or more hydroxyl groups of the esterified compound.

26. A method of applying to a floor surface an aqueous composition comprising a water-insoluble polymer and at least one compound selected from the group consisting of ester compounds obtained by reacting a hydroxycarboxylic acid with at least one glycol ether so that substantially all of the carboxyl groups are esterified, and acetylated ester compounds shown in (a) and (b) below:

(a) acetylated ester compounds obtained by acetylating one or more hydroxyl groups of a hydroxycarboxylic acid and reacting the acetylated compound with at least one glycol ether so that substantially all of the carboxyl groups are esterified;

(b) acetylated ester compounds obtained by reacting a hydroxycarboxylic acid with at least one glycol ether so that substantially all of the carboxyl groups are esterified and then acetylating one or more hydroxyl groups of the esterified compound.

Effects of the Invention

The floor-polish composition comprising the leveling agent of the invention has a satisfactory leveling property for practical use. The leveling property of the composition is remarkably high, compared to those of conventional floor-polish compositions containing aliphatic compounds.

Further, the floor-polish composition of the invention has excellent gloss and water resistance. Therefore, application of the composition can impart an excellent appearance to floor surfaces, regardless of the kind of floor material.

BEST MODE FOR CARRYING OUT THE INVENTION

The present invention is described below in more detail.

(I) Floor-Polish Leveling Agent

First Leveling Agent

The first floor-polish leveling agent of the invention comprises an ester compound obtained by reacting a hydroxycarboxylic acid with at least one glycol ether so that substantially all of the carboxyl groups are esterified.

A "floor polish" is applied to a floor surface to protect the floor surface and impart gloss, and is also termed a "floor-polishing composition" or a "floor-polish composition".

<Hydroxycarboxylic Acid>

Hydroxycarboxylic acid is a compound having hydroxyl group(s) and carboxyl group(s) per molecule. Hydroxycarboxylic acids are roughly classified into aliphatic hydroxycarboxylic acids and aromatic hydroxycarboxylic acids. Aliphatic hydroxycarboxylic acids are particularly preferable.

Although the total number of carbon atoms in the hydroxycarboxylic acid is not specifically limited, the hydroxycarboxylic acid preferably has about 2 to 9 carbon atoms. Although the number of functional groups in the hydroxycarboxylic acid is not specifically limited, the hydroxycarboxylic acid preferably has about 1 to 3 hydroxyl groups and about 1 to 3 carboxyl groups per molecule. When the total number of carbon atoms, number of hydroxyl groups, and number of carboxyl groups are within the above-mentioned ranges, a good leveling property can be obtained.

Examples of such aromatic hydroxycarboxylic acids include salicylic acid, mandelic acid, etc.

Such aliphatic hydroxycarboxylic acids can be represented by the following formula (1):

$$C_aH_b(COOH)_m(OH)_n \qquad (1)$$

wherein a is an integer from 1 to 6, m is an integer from 1 to 3, n is an integer from 1 to 3, and b is an integer satisfying 2a+2=b+m+n.

Specific examples of aliphatic hydroxycarboxylic acids represented by formula (1) include glycolic acid, hydracrylic acid, lactic acid, tartronic acid, hydroxybutyric acid, malic acid, tartaric acid, hydroxyvaleric acid, citramalic acid, leucine acid, citric acid, isocitric acid, etc.

Of the compounds represented by formula (1), those wherein a is an integer from 1 to 3, m is an integer from 1 to 3, and n is 1 are particularly preferable. Examples of such hydroxycarboxylic acids include glycolic acid, lactic acid, hydroxybutyric acid, malic acid, tartaric acid, hydroxyvaleric acid, citric acid, etc. In view of easy industrial availability at low cost, lactic acid, malic acid, tartaric acid, citric acid, etc., are particularly preferable.

<Glycol Ether>

Examples of glycol ethers include ethylene oxide adducts, propylene oxide adducts, and butylene oxide adducts of alcohols or phenolic hydroxyl group-containing aromatic compounds. Preferably, about 1 to 4 alkylene oxides are added.

The alcohol to be used preferably has about 1 to 8 carbon atoms, and more preferably is a straight chain or branched chain alkyl alcohol having about 1 to 8 carbon atoms. The phenolic hydroxyl group-containing aromatic compound preferably has about 6 to 12 carbon atoms.

Such glycol ethers can be represented by the following formula (2):

$$R^1O(R^1O)_pH \qquad (2)$$

wherein $R^1$ is a $C_{1-8}$ straight chain or branched alkyl group, or a $C_{6-12}$ aryl group, $R^2$ is a $C_{2-4}$ straight chain or branched alkylene group, and p is an integer from 1 to 4.

Examples of glycol ethers include ethylene oxide (EO) glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether, ethylene glycol mono-t-butyl ether, ethylene glycol monohexyl ether, ethylene glycol monophenyl ether, diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether, diethylene glycol mono-t-butyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monopropyl ether, tetraethylene glycol monobutyl ether, etc.; propylene oxide (PO) glycol ethers such as propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, tetrapropylene glycol monoethyl ether, tetrapropylene glycol monopropyl ether, tetrapropylene glycol monobutyl ether, etc.; butylene oxide (BO) glycol ethers such as butylene glycol monomethyl ether, butylene glycol monoethyl ether, butylene glycol monopropyl ether, butylene glycol monobutyl ether, dibutylene glycol monomethyl ether, dibutylene glycol monoethyl ether, dibutylene glycol monopropyl ether, dibutylene glycol monobutyl ether, tributylene glycol monomethyl ether, tributylene glycol monoethyl ether, tributylene glycol monopropyl ether, tributylene glycol monobutyl ether, tetrabutylene glycol monomethyl ether, tetrabutylene glycol monoethyl ether, tetrabutylene glycol monopropyl ether, tetrabutylene glycol monobutyl ether, etc.

In the formula (2), $R^1$ is preferably a $C_{1-8}$ straight chain or branched alkyl group, and more preferably a $C_{1-4}$ straight chain or branched alkyl group.

Examples of such glycol ethers include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monopropyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, tetrapropylene glycol monoethyl ether, tetrapropylene glycol monopropyl ether, tetrapropylene glycol monobutyl ether, butylene glycol monomethyl ether, butylene glycol monoethyl ether, butylene glycol monopropyl ether, butylene glycol monobutyl ether, dibutylene glycol monomethyl ether, dibutylene glycol monoethyl ether, dibutylene glycol monopropyl ether, dibutylene glycol monobutyl ether, tributylene glycol monomethyl ether, tributylene glycol monoethyl ether, tributylene glycol monopropyl ether, tributylene glycol monobutyl ether, tetrabutylene glycol monomethyl ether, tetrabutylene glycol monoethyl ether, tetrabutylene glycol monopropyl ether, tetrabutylene glycol monobutyl ether, etc.

In formula (2), more preferably, $R^1$ is a $C_1$ or $C_4$ straight chain or branched alkyl group, $R^2$ is a $C_{2-3}$ straight chain or branched alkylene group, and p is an integer from 1 to 3. In view of easy industrial availability at low cost, glycol ethers of formula (2) in which $R^1$ is a $C_1$ or $C_4$ straight chain or branched alkyl group, $R^2$ is a $C_{2-3}$ straight chain or branched alkylene group, and p is an integer from 1 to 3 are preferable.

Examples of such glycol ethers include ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, propylene glycol monomethyl ether, propylene glycol monobutyl ether, dipropylene glycol monomethyl ether, dipropylene glycol monobutyl ether, tripropylene glycol monomethyl ether, tripropylene glycol monobutyl ether, etc.

Such glycol ethers can be used singly or in a combination of two or more.

<Ester Compound>

The ester compound of the present invention is a compound obtained by subjecting a hydroxycarboxylic acid and a glycol ether to an esterification reaction. Substantially all the carboxyl groups are esterified.

When the hydroxycarboxylic acid is a dicarboxylic acid, the molar ratio of glycol ether-residues to hydroxycarboxylic acid residues (the glycol ether residue/hydroxycarboxylic acid residue molar ratio) in the ester compound of the invention is generally 2, and when the hydroxycarboxylic acid is a tricarboxylic acid, the molar ratio is generally 3. When the hydroxycarboxylic acid is a monocarboxylic acid, the molar ratio is generally 1. However, when hydroxycarboxylic acids are capable of undergoing intermolecular dehydration reaction between themselves, the ester compound of the invention includes ester mixtures containing an ester of a hydroxycarboxylic acid monomer with a glycol ether and an ester of a hydroxycarboxylic acid condensate such as a dimer or trimer with a glycol ether, the hydroxycarboxylic acid condensate being obtained by intermolecular dehydration reaction of hydroxycarboxylic acids. Examples of hydroxycarboxylic acids that are capable of undergoing intermolecular dehydration reaction between themselves include lactic acid.

Examples of combinations of a hydrocarboxylic acid and a glycol ether to produce the ester compound of the invention include
malic acid/ethylene glycol monomethyl ether,
malic acid/ethylene glycol monoethyl ether,
malic acid/ethylene glycol monopropyl ether,
malic acid/ethylene glycol monobutyl ether,
malic acid/diethylene glycol monomethyl ether,
malic acid/diethylene glycol monoethyl ether,
malic acid/diethylene glycol monopropyl ether,
malic acid/diethylene glycol monobutyl ether,
malic acid/triethylene glycol monomethyl ether,
malic acid/triethylene glycol monobutyl ether,
malic acid/tetraethylene glycol monomethyl ether,
malic acid/tetraethylene glycol monobutyl ether,
malic acid/propylene glycol monomethyl ether,
malic acid/propylene glycol monoethyl ether,
malic acid/propylene glycol monopropyl ether,
malic acid/propylene glycol monobutyl ether,
malic acid/dipropylene glycol monomethyl ether,
malic acid/dipropylene glycol monoethyl ether,
malic acid/dipropylene glycol monopropyl ether,
malic acid/dipropylene glycol monobutyl ether,
malic acid/tripropylene glycol monomethyl ether,
malic acid/tripropylene glycol monobutyl ether,
malic acid/butylene glycol monomethyl ether,
malic acid/butylene glycol monoethyl ether,
malic acid/butylene glycol monopropyl ether,
malic acid/butylene glycol monobutyl ether,
malic acid/dibutylene glycol monomethyl ether,
malic acid/dibutylene glycol monobutyl ether,
malic acid/tributylene glycol monomethyl ether,
malic acid/tributylene glycol monobutyl ether;
citric acid/ethylene glycol monomethyl ether,
citric acid/ethylene glycol monoethyl ether,
citric acid/ethylene glycol monopropyl ether,
citric acid/ethylene glycol monobutyl ether,
citric acid/diethylene glycol monomethyl ether,
citric acid/diethylene glycol monoethyl ether,
citric acid/diethylene glycol monopropyl ether,
citric acid/diethylene glycol monobutyl ether,
citric acid/triethylene glycol monomethyl ether,
citric acid/triethylene glycol monobutyl ether,
citric acid/tetraethylene glycol monomethyl ether,
citric acid/tetraethylene glycol monobutyl ether,
citric acid/propylene glycol monomethyl ether,
citric acid/propylene glycol monoethyl ether,
citric acid/propylene glycol monopropyl ether,
citric acid/propylene glycol monobutyl ether,
citric acid/dipropylene glycol monomethyl ether,
citric acid/dipropylene glycol monoethyl ether,
citric acid/dipropylene glycol monopropyl ether,
citric acid/dipropylene glycol monobutylether,
citric acid/tripropylene glycol monomethyl ether,
citric acid/tripropylene glycol monobutyl ether,
citric acid/butylene glycol monomethyl ether,
citric acid/butylene glycol monoethyl ether,
citric acid/butylene glycol monopropyl ether, citric acid/butylene glycol monobutyl ether,
citric acid/dibutylene glycol monomethyl ether,
citric acid/dibutylene glycol monobutyl ether,
citric acid/tributylene glycol monomethyl ether,
citric acid/tributylene glycol monobutyl ether;
lactic acid/ethylene glycol monomethyl ether,
lactic acid/ethylene glycol monoethyl ether,
lactic acid/ethylene glycol monopropyl ether,
lactic acid/ethylene glycol monobutyl ether,
lactic acid/diethylene glycol monomethyl ether,
lactic acid/diethylene glycol monoethyl ether,
lactic acid/diethylene glycol monopropyl ether,
lactic acid/diethylene glycol monobutyl ether,
lactic acid/triethylene glycol monomethyl ether,
lactic acid/triethylene glycol monobutyl ether,
lactic acid/tetraethylene glycol monomethyl ether,
lactic acid/tetraethylene glycol monobutyl ether,
lactic acid/propylene glycol monomethyl ether,
lactic acid/propylene glycol monoethyl ether,
lactic acid/propylene glycol monopropyl ether,
lactic acid/propylene glycol monobutyl ether,
lactic acid/dipropylene glycol monomethyl ether,
lactic acid/dipropylene glycol monoethyl ether,
lactic acid/dipropylene glycol monopropyl ether,
lactic acid/dipropylene glycol monobutyl ether,
lactic acid/tripropylene glycol mononethyl ether,
lactic acid/tripropylene glycol monobutyl ether,
lactic acid/butylene glycol monomethyl ether,
lactic acid/butylene glycol monoethyl ether,
lactic acid/butylene glycol monopropyl ether,
lactic acid/butylene glycol monobutyl ether,
lactic acid/dibutylene glycol monomethyl ether,
lactic acid/dibutylene glycol monobutyl ether,
lactic acid/tributylene glycol monomethyl ether,
lactic acid/tributylene glycol monobutyl ether;
tartaric acid/ethylene glycol monomethyl ether,
tartaric acid/ethylene glycol monoethyl ether,
tartaric acid/ethylene glycol monopropyl ether,
tartaric acid/ethylene glycol monobutyl ether,
tartaric acid/diethylene glycol monomethyl ether,
tartaric acid/diethylene glycol monoethyl ether,
tartaric acid/diethylene glycol monopropyl ether,
tartaric acid/diethylene glycol monobutyl ether,
tartaric acid/triethylene glycol monomethyl ether,
tartaric acid/triethylene glycol monobutyl ether,
tartaric acid/tetraethylene glycol monomethyl ether,
tartaric acid/tetraethylene glycol monobutyl ether,
tartaric acid/propylene glycol monomethyl ether,
tartaric acid/propylene glycol monoethyl ether,
tartaric acid/propylene glycol monopropyl ether,
tartaric acid/propylene glycol monobutyl ether,
tartaric acid/dipropylene glycol monomethyl ether,
tartaric acid/dipropylene glycol monoethyl ether,
tartaric acid/dipropylene glycol monopropyl ether,
tartaric acid/dipropylene glycol monobutyl ether,
tartaric acid/tripropylene glycol monomethyl ether,
tartaric acid/tripropylene glycol monobutyl ether,
tartaric acid/butylene glycol monomethyl ether,
tartaric acid/butylene glycol monoethyl ether,
tartaric acid/butylene glycol monopropyl ether,
tartaric acid/butylene glycol monobutyl ether,
tartaric acid/dibutylene glycol monomethyl ether,
tartaric acid/dibutylene glycol monobutyl ether,
tartaric acid/tributylene glycol monomethyl ether,
tartaric acid/tributylene glycol monobutyl ether;
isocitric acid/ethylene glycol monomethyl ether,
isocitric acid/ethylene glycol monoethyl ether,
isocitric acid/ethylene glycol monopropyl ether,
isocitric acid/ethylene glycol monobutyl ether,
isocitric acid/diethylene glycol monomethyl ether,
isocitric acid/diethylene glycol monoethyl ether,
isocitric acid/diethylene glycol monopropyl ether,
isocitric acid/diethylene glycol monobutyl ether,
isocitric acid/triethylene glycol monomethyl ether,
isocitric acid/triethylene glycol monobutyl ether,
isocitric acid/tetraethylene glycol monomethyl ether,
isocitric acid/tetraethylene glycol monobutyl ether,
isocitric acid/propylene glycol monomethyl ether,
isocitric acid/propylene glycol monoethyl ether,
isocitric acid/propylene glycol monopropyl ether,
isocitric acid/propylene glycol monobutyl ether,
isocitric acid/dipropylene glycol monomethyl ether,
isocitric acid/dipropylene glycol monoethyl ether,
isocitric acid/dipropylene glycol monopropyl ether,
isocitric acid/dipropylene glycol monobutyl ether,
isocitric acid/tripropylene glycol monomethyl ether,
isocitric acid/tripropylene glycol monobutyl ether,
isocitric acid/butylene glycol monomethyl ether,
isocitric acid/butylene glycol monoethyl ether,
isocitric acid/butylene glycol monopropyl ether,
isocitric acid/butylene glycol monobutyl ether,
isocitric acid/dibutylene glycol monomethyl ether,
isocitric acid/dibutylene glycol monobutyl ether,
isocitric acid/tributylene glycol monomethyl ether,
isocitric acid/tributylene glycol monobutyl ether;
glycolic acid/ethylene glycol monomethyl ether,
glycolic acid/ethylene glycol monoethyl ether,
glycolic acid/ethylene glycol monopropyl ether,
glycolic acid/ethylene glycol monobutyl ether,
glycolic acid/diethylene glycol monomethyl ether,
glycolic acid/diethylene glycol monoethyl ether,
glycolic acid/diethylene glycol monopropyl ether,
glycolic acid/diethylene glycol monobutyl ether,
glycolic acid/triethylene glycol monomethyl ether,
glycolic acid/triethylene glycol monobutyl ether,
glycolic acid/tetraethylene glycol monomethyl ether,
glycolic acid/tetraethylene glycol monobutyl ether,
glycolic acid/propylene glycol monomethyl ether,
glycolic acid/propylene glycol monoethyl ether,
glycolic acid/propylene glycol monopropyl ether,
glycolic acid/propylene glycol monobutyl ether,
glycolic acid/dipropylene glycol monomethyl ether,
glycolic acid/dipropylene glycol monoethyl ether,
glycolic acid/dipropylene glycol monopropyl ether,
glycolic acid/dipropylene glycol monobutyl ether,
glycolic acid/tripropylene glycol monomethyl ether,
glycolic acid/tripropylene glycol monobutyl ether,
glycolic acid/butylene glycol monomethyl ether,
glycolic acid/butylene glycol monoethyl ether,
glycolic acid/butylene glycol monopropyl ether,
glycolic acid/butylene glycol monobutyl ether,
glycolic acid/dibutylene glycol monomethyl ether,
glycolic acid/dibutylene lycol monobutyl ether,
glycolic acid/tributylene glycol monomethyl ether,
glycolic acid/tributylene glycol monobutyl ether;
hydroxybutyric acid/ethylene glycol monomethyl ether,
hydroxybutyric acid/ethylene glycol monoethyl ether,
hydroxybutyric acid/ethylene glycol monopropyl ether,
hydroxybutyric acid/ethylene glycol monobutyl ether,
hydroxybutyric acid/diethylene glycol monomethyl ether,
hydroxybutyric acid/diethylene glycol monoethyl ether,
hydroxybutyric acid/diethylene glycol monopropyl ether,
hydroxybutyric acid/diethylene glycol monobutyl ether,
hydroxybutyric acid/triethylene glycol monomethyl ether, hydroxybutyric acid/triethylene glycol monobutyl ether,
hydroxybutyric acid/tetraethylene glycol monomethyl ether,
hydroxybutyric acid/tetraethylene glycol monobutyl ether,
hydroxybutyric acid/propylene glycol monomethyl ether,
hydroxybutyric acid/propylene glycol monoethyl ether,
hydroxybutyric acid/propylene glycol monopropyl ether,
hydroxybutyric acid/propylene glycol monobutyl ether,
hydroxybutyric acid/dipropylene glycol monomethyl ether,
hydroxybutyric acid/dipropylene glycol monoethyl ether,
hydroxybutyric acid/dipropylene glycol monopropyl ether,
hydroxybutyric acid/dipropylene glycol monobutyl ether,
hydroxybutyric acid/tripropylene glycol monomethyl ether,
hydroxybutyric acid/tripropylene glycol monobutyl ether,
hydroxybutyric acid/butylene glycol monomethyl ether,
hydroxybutyric acid/butylene glycol monoethyl ether,
hydroxybutyric acid/butylene glycol monopropyl ether,
hydroxybutyric acid/butylene glycol monobutyl ether,
hydroxybutyric acid/dibutylene glycol monomethyl ether,
hydroxybutyric acid/dibutylene glycol monobutyl ether,
hydroxybutyric acid/tributylene glycol monomethyl ether,
hydroxybutyric acid/tributylene glycol monobutyl ether;
hydroxyvaleric acid/ethylene glycol monomethyl ether,
hydroxyvaleric acid/ethylene glycol monoethyl ether,
hydroxyvaleric acid/ethylene glycol monopropyl ether,
hydroxyvaleric acid/ethylene glycol monobutyl ether,
hydroxyvaleric acid/diethylene glycol monomethyl ether,
hydroxyvaleric acid/diethylene glycol monoethyl ether,
hydroxyvaleric acid/diethylene glycol monopropyl ether,
hydroxyvaleric acid/diethylene glycol monobutyl ether,
hydroxyvaleric acid/triethylene glycol monomethyl ether,
hydroxyvaleric acid/triethylene glycol monobutyl ether,
hydroxyvaleric acid/tetraethylene glycol monomethyl ether,
hydroxyvaleric acid/tetraethylene glycol monobutyl ether,
hydroxyvaleric acid/propylene glycol monomethyl ether,
hydroxyvaleric acid/propylene glycol monoethyl ether,
hydroxyvaleric acid/propylene glycol monopropyl ether,
hydroxyvaleric acid/propylene glycol monobutyl ether,
hydroxyvaleric acid/dipropylene glycol monomethyl ether,
hydroxyvaleric acid/dipropylene glycol monoethyl ether,
hydroxyvaleric acid/dipropylene glycol monopropyl ether,
hydroxyvaleric acid/dipropylene glycol monobutyl ether,
hydroxyvaleric acid/tripropylene glycol monomethyl ether,
hydroxyvaleric acid/tripropylene glycol monobutyl ether,
hydroxyvaleric acid/butylene glycol monomethyl ether,
hydroxyvaleric acid/butylene glycol monoethyl ether,
hydroxyvaleric acid/butylene glycol monopropyl ether,
hydroxyvaleric acid/butylene glycol monobutyl ether,
hydroxyvaleric acid/dibutylene glycol monomethyl ether,
hydroxyvaleric acid/dibutylene glycol monobutyl ether,
hydroxyvaleric acid/tributylene glycol monomethyl ether,
hydroxyvaleric acid/tributylene glycol monobutyl ether, etc.

Among these, preferable combinations are
malic acid/ethylene glycol monomethyl ether,
malic acid/ethylene glycol monoethyl ether,
malic acid/ethylene glycol monopropyl ether,
malic acid/ethylene glycol monobutyl ether,
malic acid/diethylene glycol monomethyl ether,
malic acid/diethylene glycol monoethyl ether,
malic acid/diethylene glycol monopropyl ether,
malic acid/diethylene glycol monobutyl ether,
malic acid/triethylene glycol monomethyl ether,
malic acid/triethylene glycol monobutyl ether,
malic acid/propylene glycol monomethyl ether,
malic acid/propylene glycol monoethyl ether,
malic acid/propylene glycol monopropyl ether,
malic acid/propylene glycol monobutyl ether,
malic acid/dipropylene glycol monomethyl ether,
malic acid/dipropylene glycol monoethyl ether,
malic acid/dipropylene glycol monopropyl ether,
malic acid/dipropylene glycol monobutyl ether,
malic acid/tripropylene glycol monomethyl ether,
malic acid/tripropylene glycol monobutyl ether,
malic acid/butylene glycol monomethyl ether,
malic acid/butylene glycol monobutyl ether,
malic acid/dibutylene glycol monomethyl ether,
malic acid/dibutylene glycol monobutyl ether;
citric acid/ethylene glycol monomethyl ether,
citric acid/ethylene glycol monoethyl ether,
citric acid/ethylene glycol monopropyl ether,
citric acid/ethylene glycol monobutyl ether,
citric acid/diethylene glycol monomethyl ether,
citric acid/diethylene glycol monoethyl ether,
citric acid/diethylene glycol monopropyl ether,
citric acid/diethylene glycol monobutyl ether,
citric acid/triethylene glycol monomethyl ether,
citric acid/triethylene glycol monobutyl ether,
citric acid/propylene glycol monomethyl ether,
citric acid/propylene glycol monoethyl ether,
citric acid/propylene glycol monopropyl ether,
citric acid/propylene glycol monobutyl ether,
citric acid/dipropylene glycol monomethyl ether,
citric acid/dipropylene glycol monoethyl ether,
citric acid/dipropylene glycol monopropyl ether,
citric acid/dipropylene glycol monobutyl ether,
citric acid/tripropylene glycol monomethyl ether,
citric acid/tripropylene glycol monobutyl ether,
citric acid/butylene glycol monomethyl ether,
citric acid/butylene glycol monobutyl ether,
citric acid/dibutylene glycol monomethyl ether,
citric acid/dibutylene glycol monobutyl ether;
lactic acid/ethylene glycol monomethyl ether,
lactic acid/ethylene glycol monoethyl ether,
lactic acid/ethylene glycol monopropyl ether,
lactic acid/ethylene glycol monobutyl ether,
lactic acid/diethylene glycol monomethyl ether,
lactic acid/diethylene glycol monoethyl ether,
lactic acid/diethylene glycol monopropyl ether,
lactic acid/diethylene glycol monobutyl ether,
lactic acid/triethylene glycol monomethyl ether,
lactic acid/triethylene glycol monobutyl ether,
lactic acid/propylene glycol monomethyl ether,
lactic acid/propylene glycol monoethyl ether,
lactic acid/propylene glycol monopropyl ether,
lactic acid/propylene glycol monobutyl ether,
lactic acid/dipropylene glycol monomethyl ether,
lactic acid/dipropylene glycol monoethyl ether,
lactic acid/dipropylene glycol monopropyl ether,
lactic acid/dipropylene glycol monobutyl ether,
lactic acid/tripropylene glycol monomethyl ether,
lactic acid/tripropylene glycol monobutyl ether,
lactic acid/butylene glycol monomethyl ether,
lactic acid/butylene glycol monoethyl ether,
lactic acid/butylene glycol monopropyl ether,
lactic acid/butylene glycol monobutyl ether,
lactic acid/dibutylene glycol monomethyl ether,
lactic acid/dibutylene glycol monobutyl ether;
tartaric acid/ethylene glycol monomethyl ether,
tartaric acid/ethylene glycol monoethyl ether,
tartaric acid/ethylene glycol monopropyl ether,
tartaric acid/ethylene glycol monobutyl ether,
tartaric acid/diethylene glycol monomethyl ether,
tartaric acid/diethylene glycol monoethyl ether,
tartaric acid/diethylene glycol monopropyl ether,
tartaric acid/diethylene glycol monobutyl ether, tartaric acid/triethylene glycol monomethyl ether,
tartaric acid/triethylene glycol monobutyl ether,
tartaric acid/propylene glycol monomethyl ether,
tartaric acid/propylene glycol monoethyl ether,
tartaric acid/propylene glycol monopropyl ether,
tartaric acid/propylene glycol monobutyl ether,
tartaric acid/dipropylene glycol monomethyl ether,
tartaric acid/dipropylene glycol monoethyl ether,
tartaric acid/dipropylene glycol monopropyl ether,
tartaric acid/dipropylene glycol monobutyl ether,
tartaric acid/tripropylene glycol monomethyl ether,
tartaric acid/tripropylene glycol monobutyl ether,
tartaric acid/butylene glycol monomethyl ether,
tartaric acid/butylene glycol monoethyl ether,
tartaric acid/butylene glycol monopropyl ether,
tartaric acid/butylene glycol monobutyl ether,
tartaric acid/dibutylene glycol monomethyl ether,
tartaric acid/dibutylene glycol monobutyl ether;
isocitric acid/ethylene glycol monomethyl ether,
isocitric acid/ethylene glycol monoethyl ether,
isocitric acid/ethylene glycol monopropyl ether,
isocitric acid/ethylene glycol monobutyl ether,
isocitric acid/diethylene glycol monomethyl ether,
isocitric acid/diethylene glycol monoethyl ether,
isocitric acid/diethylene glycol monopropyl ether,
isocitric acid/diethylene glycol monobutyl ether,
isocitric acid/triethylene glycol monomethyl ether,
isocitric acid/triethylene glycol monobutyl ether,
isocitric acid/propylene glycol monomethyl ether,
isocitric acid/propylene glycol monoethyl ether,
isocitric acid/propylene glycol monopropyl ether,
isocitric acid/propylene glycol monobutyl ether,
isocitric acid/dipropylene glycol monomethyl ether,
isocitric acid/dipropylene glycol monoethyl ether,
isocitric acid/dipropylene glycol monopropyl ether,
isocitric acid/dipropylene glycol monobutyl ether,
isocitric acid/tripropylene glycol monomethyl ether,
isocitric acid/tripropylene glycol monobutyl ether,
isocitric acid/butylene glycol monomethyl ether,
isocitric acid/butylene glycol monoethyl ether,
isocitric acid/butylene glycol monopropyl ether,
Isocitric acid/butylene glycol monobutyl ether,
isocitric acid/dibutylene glycol monomethyl ether, and
isocitric acid/dibutylene glycol monobutyl ether.

More preferable are
malic acid/ethylene glycol monobutyl ether,
malic acid/diethylene glycol monobutyl ether,
malic acid/triethylene glycol monobutyl ether,
malic acid/propylene glycol monobutyl ether,
malic acid/dipropylene glycol monobutyl ether,
malic acid/tripropylene glycol monobutyl ether;
citric acid/ethylene glycol monobutyl ether,
citric acid/diethylene glycol monobutyl ether,
citric acid/triethylene glycol monobutyl ether,
citric acid/propylene glycol monobutyl ether,
citric acid/dipropylene glycol monobutyl ether,
citric acid/tripropylene glycol monobutyl ether;
lactic acid/ethylene glycol monobutyl ether,
lactic acid/diethylene glycol monobutyl ether,
lactic acid/triethylene glycol monobutyl ether,
lactic acid/propylene glycol monobutyl ether,
lactic acid/dipropylene glycol monobutyl ether,
lactic acid/tripropylene glycol monobutyl ether;
tartaric acid/ethylene glycol monobutyl ether,
tartaric acid/diethylene glycol monobutyl ether,
tartaric acid/triethylene glycol monobutyl ether,
tartaric acid/propylene glycol monobutyl ether,
tartaric acid/dipropylene glycol monobutyl ether, and
tartaric acid/tripropylene glycol monobutyl ether.

<Production Method>

The esterification reaction of a hydroxycarboxylic acid with a glycol ether can be performed according to conventional methods. More specifically, a hydroxycarboxylic acid and a glycol ether are reacted in a suitable solvent in the presence of an acid catalyst.

<Use>

The ester compound of the invention can be used as a floor-polish leveling agent, or can be used to produce a floor-polish leveling agent.

Second Leveling Agent

The second leveling agent of the invention contains an acetylated ester compound shown in (a) or (b) below.

(a) an acetylated ester compound obtained by acetylating one or more hydroxyl groups of a hydroxycarboxylic acid and reacting the acetylated compound with at least one glycol ether so that substantially all of the carboxyl groups are esterified;

(b) an acetylated ester compound obtained by reacting a hydroxycarboxylic acid with at least one glycol ether so that substantially all of the carboxyl groups are esterified and then acetylating one or more hydroxyl groups of the esterified compound.

The proportion of the acetylated hydroxyl groups is not particularly limited, and all or some of the hydroxyl groups may be acetylated.

Examples of usable hydroxycarboxylic acids and glycol ethers and preferable examples thereof are as described for the first leveling agent.

<Use>

The acetylated ester compound of the invention can be used as a floor-polish leveling agent, or can be used to produce a floor-polish leveling agent.

(II) Aqueous Floor-Polish Composition

The aqueous floor-polish composition of the invention comprises at least one member selected from the group consisting of the above-mentioned ester compounds and acetylated ester compounds, and a water-insoluble polymer.

This composition can be produced by a process comprising the step of mixing at least one member selected from the group consisting of the above-mentioned ester compounds and acetylated ester compounds with a component containing a water-insoluble polymer.

Ester Compound and Acetylated Ester Compound

The kinds of ester compounds and acetylated ester compounds, and the preferable kinds of compounds thereof are as described above.

The aqueous floor-polish composition of the invention contains one or more kinds of the above-mentioned ester compounds and acetylated ester compounds. The composition may contain: one or more kinds of ester compounds, or one or more kinds of acetylated ester compounds, or one or more kinds of ester compounds and one or more kinds of acetylated ester compounds.

The amount of ester compound and/or acetylated ester compound used may be any amount effective to impart a leveling capability to the composition. More specifically, the ester compound and/or acetylated ester compound is preferably used in an amount of about 0.005 wt. % to about 20 wt. %, more preferably about 0.05 wt. % to about 10 wt. %, and still more preferably about 0.1 wt. % to about 5 wt. %, based on the total weight of the aqueous composition.

When the amount used is within the above-mentioned range, a leveling property sufficient for practical use can be obtained, and bleeding of the leveling agent does not occur.

Water-Insoluble Polymer

Examples of usable water-insoluble polymers include any water-insoluble polymers known as polymers in a floor-polish. Examples of such polymers include polymers or copolymers of ethylenic unsaturated bond-containing monomers, and urethane polymers. Such water-insoluble polymers can be used singly or in a combination of two or more.

Examples of ethylenic unsaturated bond-containing monomers include acrylic monomers such as methacrylic acid, acrylic acid, itaconic acid, crotonic acid, alkyl methacrylates (for example, $C_{1-4}$ alkyl methacylates such as methyl methacrylate, ethyl methacrylate, butyl methacrylate, 2-hydroxyethyl methacrylate, etc.), alkyl acrylates (for example, $C_{1-4}$ alkyl acrylates such as methyl acrylate, ethyl acrylate, butyl acrylate, 2-hydroxyethyl acrylate, etc.), acrylamide, methacrylamide, dimethylacrylamide, etc.; fumaric acid; maleic acid; styrene; vinyltoluene; acrylonitrile; methacrylonitrile, etc. Among these, acrylic monomers are preferable, and methacrylic acid, acrylic acid, alkyl acrylate, alkyl methacrylate, styrene, etc., are more preferable.

Examples of usable urethane polymers include any urethane polymers known as water-insoluble polymers in floor-polish compositions.

Examples of particularly preferable water-insoluble polymers are acrylic polymers, styrene-acrylic polymers, urethane polymers and urethane-acrylic polymers. Polymers or copolymers of ethylenic unsaturated bond-containing monomers such as acrylic polymers and styrene-acrylic polymers are especially preferable. Examples of styrene-acrylic polymers include copolymers of styrene and an acrylic monomer, and mixtures of polystyrene and an acrylic polymer. Examples of urethane-acrylic polymers include mixtures of polyurethane and an acrylic polymer.

The water-insoluble polymer used is preferably crosslinked wholly or partially with a polyvalent metal such as calcium, zinc, and aluminum. Polyvalent metal ions can be added in the form of zinc ammonium carbonate, calcium hydroxide, etc. Examples of commercially available metal-crosslinked water-insoluble polymers include a metal-crosslinked acrylic emulsion "DURAPLUS 2" (trade name, product of Rohm and Haas Company).

The composition of the invention preferably contains a water-insoluble polymer in the form of an emulsified polymer. The emulsion polymerization can be performed by a known method. The emulsified polymer of an ethylenic unsaturated bond-containing monomer can be obtained, for example, by heating and stirring a mixture of water, a monomer, a polymerization initiator, and an anionic or nonionic surfactant as an emulsifier. The emulsified urethane polymer can be obtained, for example, by heating and stirring a mixture of water, polyisocyanate, polyol, and the above-mentioned emulsifier.

The composition may contain such a water-insoluble polymer in any amount effective to protect floor surfaces and impart gloss. More specifically, the water-insoluble polymer is preferably used in an amount of about 1 to 50 wt. %, on a solids basis, and more preferably about 5 to 35 wt. %, based on the total weight of the composition.

When the amount used is within the above-mentioned range, the obtained composition can protect floor surfaces sufficiently for practical use and impart gloss, and has a viscosity that allows easy application.

Other Components

The composition of the invention may contain other components that are usually contained in aqueous floor-polish compositions. Examples of such components include surfactants, coalescents, plasticizers, synthetic or natural waxes, alkali-soluble resins, defoaming agents, antiseptics, etc.

<Surfactant>

Examples of usable surfactants include any surfactants known for use in aqueous floor-polish compositions. Examples of such known surfactants include nonionic surfactants such as polyoxyethylene alkyl ether, polyoxyethylene alkyl phenyl ether, polyether-modified silicone surfactants, etc.; anionic surfactants such as dioctylsulfosuccinates; and fluorinated surfactants such as fluoroalkyl compounds. Examples of commercially available surfactants include a fluorinated surfactant "Surflon S-11" (trade name) (product of SEIMI CHEMICAL Co., LTd.), a nonionic surfactant "BYK-347" (product of BYK-Chemie Japan), etc.

Such surfactants can be used singly or in a combination of two or more.

When such a surfactant is added to an aqueous floor-polish composition, the composition has a reduced surface tension and thus exhibits enhanced wettability on floor surfaces and an improved leveling property when applied or re-applied.

The surfactant, when used, can be used in any amount effective to enhance wettability on floor surfaces and the leveling property. More specifically, the amount of surfactant is preferably about 0.001 to about 5 wt. %, and more preferably about 0.005 to about 2 wt. %, based on the total weight of the composition. When the amount is within the above-mentioned range, the wettability and leveling property can be enhanced to levels sufficient for practical use, and foaming can be suppressed when applying the composition.

<Coalescent>

Examples of usable coalescents include any substances known for use as coalescents in aqueous floor-polish compositions. Examples of such coalescents include diethylene glycol monoalkyl ethers such as diethylene glycol monoethyl ether; and dipropylene glycol monoalkyl ethers such as dipropylene glycol monomethyl ether.

Such coalescents can be used singly or in a combination of two or more.

A coalescent can temporarily soften water-insoluble polymers (in particular, emulsion particles thereof) and thus has the function of aiding continuous film formation.

Such a coalescent, when used, can be used in any amount effective to aid the continuous film formation of a water-insoluble polymer. More specifically, the amount is preferably about 1 to about 20 wt. %, and more preferably about 3 to about 15 wt. %, based on the total weight of the composition. When the amount is within the above-mentioned range, the coalescent can sufficiently promote continuous film formation for practical use, and bleeding of the coalescent does not occur.

<Plasticizer>

Examples of usable plasticizers include any plasticizers known for use in aqueous floor-polish compositions. Examples of such known plasticizers include carboxylate esters such as oleates, adipates, azelates, sebacates, etc. Such plasticizers can be stably stored, are available at low cost, and are easily usable by adding to aqueous compositions.

Such plasticizers can be used singly or in a combination of two or more.

Such plasticizers, when used, can be used in any amount effective to adjust the hardness and flexibility of the obtained resin film. More specifically, the amount is preferably 10 wt. % or less, and more preferably about 0.5 to about 5 wt. %, based on the total weight of the composition. When the amount is within the above-mentioned range, plasticization effects sufficient for practical use can be obtained, the obtained film has sufficient hardness, and does not easily stain or wear out, and no bleeding of the plasticizer occurs.

<Synthetic and Natural Wax>

Examples of usable waxes include any waxes known for use in aqueous floor-polish compositions. The composition of the invention preferably contains such a wax in the form of an emulsion. Examples of such known wax emulsions include synthetic wax emulsions such as polyolefin wax emulsions, acrylic wax emulsions, ionomer resin emulsions, etc., and various natural wax emulsions. Examples of commercially available wax emulsions include a synthetic wax emulsion "HYTEC E-4000" (trade name) (Toho Chemical Industry Co., Ltd.), etc.

Such synthetic or natural waxes can be used singly or in a combination of two or more.

A wax has the function of imparting gloss, water repellency, water resistance, etc., to floor surfaces.

Such a wax, when used, can be used in any amount effective to impart gloss, water repellency, and water resistance to floor surfaces. More specifically, the amount is preferably about 0.1 to about 10 wt. %, and more preferably about 0.3 to about 5 wt. %, based on the total weight of the composition. When the amount is within the above-mentioned range, effects obtainable by adding a wax can be sufficiently achieved, and the obtained composition has a viscosity that allows easy application.

<Alkali-Soluble Resin>

Examples of usable alkali-soluble resins include any alkali-soluble resins known for use in aqueous floor-polish compositions. Examples of such known alkali-soluble resins include styrene-maleic acid copolymers, acrylic resins, rosin-maleic acid copolymers, etc. Examples of commercially available alkali-soluble resins include "Primal E-1531B" (trade name)(product of Rohm and Haas Company), "Primal B-644" (trade name)(product of Rohm and Haas Company), "SMA2625A" (trade name) (product of Allied Chemical Corporation), etc.

Such alkali-soluble resins can be used singly or in a combination of two or more kinds.

When the aqueous floor-polish composition contains such an alkali-soluble resin, the composition can easily be applied to a floor surface evenly and form a smooth coating film. The alkali-soluble resin also has the function of enhancing the adhesion of the coating film of the floor-polish composition to floor surfaces. Furthermore, the alkali-soluble resin has the function of facilitating the peeling-off of the obtained coating film because the alkali-soluble resin swells and dissolves by an alkali chemical contained in a release agent used to peel off the formed coating film, thereby reducing the coating film strength.

The alkali-soluble resin, when used, can be used in any amount effective to provide the above-mentioned effects. More specifically, the amount is preferably not more than 10 wt. %, and more preferably about 0.5 to about 5 wt. %, based on the total weight of the composition. When the amount is within the above-mentioned range, effects obtainable by adding an alkali-soluble resin can be sufficiently achieved, and the obtained composition has a viscosity that allows easy application.

Applicable Objects

The floor-polish composition of the invention can be used to coat floor surfaces. The floor-polish composition of the invention can be applied to floor surfaces made of any materials, and can provide an excellent appearance and smooth surfaces. Examples of flooring materials include chemical flooring materials composed of synthetic resins such as vinyl resins, methacrylic resins, urethane resins, and epoxy resins; wood flooring materials; cement flooring materials; stone flooring materials such as marble; etc. The composition of the invention is particularly suitable for application to chemical flooring materials.

EXAMPLES

The present invention is described below in more detail with reference to Examples and Test Examples. However, the present invention is not limited to the Examples.

(1) Synthesis of an Ester Compound and an Acetylated Ester Compound

Synthesis Example 1

Synthesis of an Ester Compound of Citric Acid with Ethylene Glycol Monobutyl Ether 192.1 g (1.00 mol) of citric acid, 372.3 g (3.15 mol) of ethylene glycol monobutyl ether, 1.9 g (0.01 mol) of p-toluenesulfonic acid, and 160 g of toluene were placed into a 2-liter 4-necked flask equipped with a stirrer, a thermometer, a water trap, and a reflux condenser. This mixture was heated while stirring at normal pressure, and refluxing began at 115° C. 8.5 hours after the start of the reaction, the reflux temperature reached 145° C. and the reaction mixture had an acid value of 19.5 (mgKOH/g), thus completing the reaction. After completion of the reaction, the reaction mixture was cooled to 60° C. and neutralized by adding 22.8 g of sodium carbonate and 200 g of water. After the organic layer was washed with 200 g of water, toluene was removed by vacuum distillation under the conditions of 120° C. and 4 kPa and steam distillation was also performed at 120° C. and 4 kPa for 1 hour, thus yielding 443.5 g of a pale yellow transparent liquid.

A triester of citric acid and ethylene glycol monobutyl ether was thereby obtained.

The crude yield calculated by assuming that all of the liquid obtained was the intended compound was 90.0%. The acid value was 0.68 (mgKOH/g).

Synthesis Example 2

Synthesis of an Ester Compound of Citric Acid with Diethylene Glycol Monobutyl Ether The procedure of Synthesis Example 1 was followed except that 510.9 g (3.15 mol) of diethylene glycol monobutyl ether was used as the starting material glycol ether in place of 372.3 g (3.15 mol) of ethylene glycol monobutyl ether, thus yielding 379.0 g of a pale yellow transparent liquid.

A triester of citric acid with diethylene glycol monobutyl ether was thereby obtained.

The crude yield calculated by assuming that all of the liquid obtained was the intended compound was 60.6%. The acid value was 0.71 (mgKOH/g).

Synthesis Example 3

Synthesis of an Ester Compound of Citric Acid with Propylene Glycol Monobutyl Ether The procedure of Synthesis Example 1 was followed except that 416.4 g (3.15 mol) of propylene glycol monobutyl ether was used as the starting material glycol ether in place of 372.3 g (3.15 mol) of ethylene glycol monobutyl ether, thus yielding 376.8 g of a pale yellow transparent liquid.

A triester of citric acid with propylene glycol monobutyl ether was thereby obtained.

The crude yield calculated by assuming that all of the liquid obtained was the intended compound was 70.8%. The acid value was 0.59 (mgKOH/g).

Synthesis Example 4

Synthesis of an Ester Compound of Malic Acid with Ethylene Glycol Monobutyl Ether The procedure of Synthesis Example 1 was followed except that the flask was changed to a 1-liter 4-necked flask, 134.1 g (1.00 mol) of malic acid was used as the starting hydroxycarboxylic acid in place of 192.1 g (1.00 mol) of citric acid, and ethylene glycol monobutyl ether was used in an amount of 248.2 g (2.10 mol), thus yielding 312.8 g of a pale yellow transparent liquid.

A diester of malic acid with ethylene glycol monobutyl ether was thereby obtained.

The crude yield calculated by assuming that all of the liquid obtained was the intended compound was 93.5%. The acid value was 0.84 (mgKOH/g).

Synthesis Example 5

Synthesis of an Ester Compound of Malic Acid with Propylene Glycol Monobutyl Ether The procedure of Synthesis Example 4 was followed except that 277.6 g (2.10 mol) of propylene glycol monobutyl ether was used as the starting material glycol ether in place of 248.2 g (2.10 mol) of ethylene glycol monobutyl ether, thus yielding 328.5 g of a pale yellow transparent liquid.

A diester of malic acid with propylene glycol monobutyl ether was thereby obtained.

The crude yield calculated by assuming that all of the liquid obtained was the intended compound was 90.6%. The acid value was 0.95 (mgKOH/g).

Synthesis Example 6

Synthesis of an Ester Compound of Malic Acid with Dipropylene Glycol Monobutyl Ether The procedure of Synthesis Example 4 was followed except that 399.6 g (2.10 mol) of dipropylene glycol monobutyl ether was used as the starting material glycol ether in place of 248.2 g (2.10 mol) of ethylene glycol monobutyl ether, thus yielding 404.1 g of a pale yellow transparent liquid.

A diester of malic acid with dipropylene glycol monobutyl ether was thereby obtained.

The crude yield calculated by assuming that all of the liquid obtained was the intended compound was 84.4%. The acid value was 0.88 (mgKOH/g).

Synthesis Example 7

Synthesis of an Ester Compound of Lactic Acid with Propylene Glycol Monobutyl Ether The procedure of Synthesis Example 5 was followed except that 112.5 g (1.00 mol as a lactic acid) of an 80% aqueous lactic acid solution was used as the starting hydroxycarboxylic acid in place of 134.1 g (1.00 mol) of malic acid and propylene glycol monobutyl ether was used in an amount of 138.8 g (1.05 mol), thus yielding 138.4 g of a colorless transparent liquid.

A reaction product of lactic acid with propylene glycol monobutyl ether was thereby obtained.

The crude yield calculated by assuming that all of the liquid obtained was the intended compound was 67.7%. The acid value was 0.78 (mgKOH/g).

Synthesis Example 8

Acetylation of the Ester Compound of Synthesis Example 4

A 1-liter 4-necked flask was equipped with a stirrer, a thermometer, a reflux condenser, and a dropping funnel. 135.6 g (0.41 mol) of the ester compound of malic acid with ethylene glycol monobutyl ether synthesized in Synthesis Example 4 was placed into the flask and the temperature was raised to 100° C. 43.5 g (0.43 mol) of acetic anhydride was then added over 1 hour using the dropping funnel. After completing the addition, the mixture solution was heated to 120° C. and maintained at the same temperature (120° C.). After 5 hours of maintaining this temperature, the reaction was completed with confirmation by gas chromatography that the peaks of the unacetylated ester compound had disappeared. After completing the reaction, the acetic acid produced was removed by reduced pressure distillation under the conditions of 120° C. and 4 kPa and steam distillation was also performed under the conditions of 120° C. and 4 kPa for 1 hour, thus yielding 147.2 g of a pale yellow transparent liquid.

(2) Preparation of an Aqueous Floor-Polish Composition

<Acrylic-Styrene Polymer Emulsion Composition>

Aqueous floor-polish compositions were prepared according to the formulations shown in Table 1 using the ester compounds obtained in Synthesis Examples 1 to 8. The obtained compositions are hereafter referred to as compositions of Examples 1 to 8, respectively.

Aqueous floor-polish compositions were prepared according to the formulations shown in Table 1 using, as ester compounds, tributoxyethyl phosphate (trade name: TBXP (product of Daihachi Chemical Industry Co., Ltd.)), bis(butyldiglycol)adipate (trade name: BXA (product of Daihachi Chemical Industry Co., Ltd.)), tributyl citrate (trade name: TBC (product of Kurogane Kasei Co., Ltd.), acetyltributyl citrate (trade name: ATBC (product of Taoka Chemical Co., Ltd.)), and 2,2,4-trimethyl-1,3-pentanediol monoisobutyrate (trade name: Texanol (product of Eastman Kodak Co.)). The obtained compositions are hereafter referred to as compositions of Comparative Examples 1 to 5.

Each composition was prepared by sequentially adding dropwise components b to h to component a (water) while stirring to give a uniform mixture.

TABLE 1

| | Component | Part by weight | Function |
|---|---|---|---|
| a | Water | 43.53 | Diluent |
| b | Primal E-1531B (solids content 38%) *1 | 2.39 | Alkali-soluble resin |
| c | Surflon S-111N (1%) *2 | 1.47 | Wetting agent |
| d | Diethylene glycol monoethyl ether *3 | 3.64 | Film formation auxiliary |
| e | Dipropylene glycol monomethyl ether *3 | 1.73 | Film formation auxiliary |
| f | Hydroxycarboxylic acid ester of the invention | 2.01 | Leveling agent, plasticizer |
| g | Duraplus 2 (solids content 38%) *4 | 38.38 | Binder |
| h | Hytec E-4000 (solids content 40%) *5 | 6.85 | Polyethylene wax |
| | | 100.00 | |

*1 Acrylic polymer emulsion (solids content 38%): product of Rohm and Haas Company
*2 Fluorinated surfactant: product of Seimi Chemical Co., Ltd.
*3 Nippon Nyukazai Co., Ltd.
*4 Acrylic-styrene polymer emulsion (solids content 38%): product of Rohm and Haas Company
*5 Polyethylene wax emulsion (solids content 40%): product of Toho Chemical Industry Co., Ltd.

Table 2 shows the ester compounds of Examples 1 to 8 and Comparative Examples 1 to 5.

TABLE 2

| | Ester compound and acetylated ester compound | |
|---|---|---|
| | Hydroxy-carboxylic acid | Glycol ether |
| Example 1 | Citric acid | Ethylene glycol monobutyl ether |
| Example 2 | Citric acid | Diethylene glycol monobutyl ether |
| Example 3 | Citric acid | Propylene glycol monobutyl ether |
| Example 4 | Malic acid | Ethylene glycol monobutyl ether |
| Example 5 | Malic acid | Propylene glycol monobutyl ether |
| Example 6 | Malic acid | Dipropylene glycol monobutyl ether |
| Example 7 | Lactic acid | Propylene glycol monobutyl ether |
| Example 8 | Compound obtained by acetylating the ester compound of Example 4 | |
| Comp. Ex. 1 | Tributoxyethyl phosphate (TBXP) | |
| Comp. Ex. 2 | Bis(butyldiglycol)adipate (BXA) | |
| Comp. Ex. 3 | Tributyl citrate (TBC) | |
| Comp. Ex. 4 | Acetyltributyl citrate (ATBC) | |
| Comp. Ex. 5 | 2,2,4-trimethyl-1,3-pentanediol monoisobutyrate (Texanol) | |

<Acrylic Polymer Emulsion Composition>

Aqueous floor-polish compositions were prepared in the same manner as in Examples 1, 2, 4, 5, 6 and 8 and Comparative Examples 1 to 5 except that an acrylic polymer emulsion "Primal B-924" (solids content 38%) (product of Rohm and Haas Company) was used in place of the acrylic-styrene polymer emulsion "Duraplus 2" (solids content 38%). The obtained compositions are hereafter referred to as compositions of Examples 1', 2', 4', 5', 6' and 8', and Comparative Examples 1' to 5', respectively.

(3) Performance Evaluation

The obtained aqueous floor-polish compositions were evaluated for their leveling property, gloss, and water resistance, using homogeneous vinyl floor tiles (products of Toyo Linoleum Co., Ltd., MATICO S Plane No. 5608), according to the following methods.

<Leveling Property>

The leveling property was evaluated in the following manner according to the Floor-polish Test Method of JIS K3920. Immediately after each of the aqueous floor-polish compositions obtained above was uniformly applied in an amount of 2 g to a 15×15 cm homogeneous vinyl floor tile test piece using gauze, the letter "x" was drawn along the diagonal lines of the tile using gauze. Each test piece was allowed to stand at room temperature for 60 minutes to dry the coating film, and the degree to which the letter "x" remained on the dried coating film was observed with the naked eye and evaluated according to the following 5 criteria:
  5: The letter "x" was barely observable.
  4: Although a slight outline of the letter "x" was observed due to some gloss change, no swelling of the coating film was observed.
  3: Although a slight outline of the letter "x" was observable, no swelling of the coating film was observed.
  2: The outline of the letter "x" was somewhat observed, and swelling of the coating film was also observed.
  1: The outline of the letter "x" and swelling of the coating film were clearly observed.

<Gloss>

Each floor-polish composition was applied to form a coating film on a homogeneous vinyl floor tile test piece in the same manner as described in the leveling property evaluation. The dried coating film was observed for gloss with the naked eye and evaluated according to the following criteria:
  5: Excellent
  4: Good
  3: Fair
  2: Poor
  1: Very poor <Water Resistance>

Each floor-polish composition was applied to form a coating film on a homogeneous vinyl floor tile test piece in the same manner as described in the leveling property evaluation. 0.1 ml of water was dropped on the dried coating film using a measuring pipette and covered with a Petri dish. After each test piece was allowed to stand at room temperature for 1 hour, the Petri dish was removed and the water drops that remained on the tile surface were wiped up with a cloth. After the test piece was further allowed to stand at room temperature for 1 hour, the test piece was observed for whitening and evaluated according to the following five criteria:
  5: Barely whitened
  4: Slightly whitened
  3: Somewhat whitened
  2: Considerably whitened
  1: Entirely whitened Tables 3 and 4 show the performance evaluation results.

TABLE 3

| | Leveling property | Gloss | Water resistance |
|---|---|---|---|
| Example 1 | 5 | 5 | 5 |
| Example 2 | 5 | 5 | 5 |
| Example 3 | 5 | 5 | 5 |
| Example 4 | 5 | 5 | 5 |
| Example 5 | 5 | 5 | 5 |
| Example 6 | 5 | 5 | 5 |

TABLE 3-continued

| | Leveling property | Gloss | Water resistance |
|---|---|---|---|
| Example 7 | 5 | 5 | 4 |
| Example 8 | 4 | 5 | 5 |
| Comp. Ex. 1 | 5 | 5 | 4 |
| Comp. Ex. 2 | 2 | 3 | 5 |
| Comp. Ex. 3 | 3 | 3 | 4 |
| Comp. Ex. 4 | 2 | 4 | 4 |
| Comp. Ex. 5 | 3 | 3 | 5 |

Table 3 clearly shows that the compositions of the invention are excellent in terms of the leveling property, gloss and water resistance. Their leveling property, gloss and water resistance levels are the same as those of the composition containing tributoxyethyl phosphate (Comparative Example 1), which is an excellent conventional leveling agent.

The composition of Example 8 comprises as a leveling agent a compound obtained by acetylating the ester compound of the composition of Example 4. The performance levels of the composition of Example 8 were almost the same as those of the composition of Example 4 containing an unacetylated ester compound.

In contrast, the composition of Comparative Example 2 with, as a leveling agent, bis(butyldiglycol)adipate containing no hydroxyl groups, the composition of Comparative Example 3 with tributyl citrate containing no ether bonds, the composition of Comparative Example 4 with acetyltributyl citrate containing no ether bonds, and the composition of Comparative Example 5 with texanol containing no ether bonds exhibited a poor leveling property and also had poor gloss generally.

The above results clearly show that the ester compounds of the invention obtained by reacting a hydroxycarboxylic acid or acetylated hydroxycarboxylic acid with glycol ether have excellent properties as a leveling agent, compared to the ester compounds of an aliphatic alcohol not having a hydroxyl group.

TABLE 4

| | Leveling property | Gloss | Water resistance |
|---|---|---|---|
| Example 1' | 5 | 5 | 4 |
| Example 2' | 5 | 5 | 4 |
| Example 4' | 5 | 5 | 5 |
| Example 5' | 5 | 5 | 5 |
| Example 6' | 5 | 5 | 5 |
| Example 8' | 4 | 5 | 5 |
| Comp. Ex. 1' | 5 | 5 | 4 |
| Comp. Ex. 2' | 2 | 3 | 4 |
| Comp. Ex. 3' | 3 | 3 | 4 |
| Comp. Ex. 4' | 2 | 4 | 4 |
| Comp. Ex. 5' | 3 | 3 | 4 |

Table 4 clearly shows that the acrylic polymer emulsion compositions of the invention obtained in Examples 1', 2', 4', 5', 6', and 8' are also excellent in terms of the leveling property, gloss and water resistance. Their leveling property, gloss and water resistance levels are the same as those of the composition containing tributoxyethyl phosphate (Comparative Example 1'), which is an excellent conventional leveling agent.

The composition of Example 8' comprises as a leveling agent a compound obtained by acetylating the ester compound of the composition of Example 4'. The performance levels of the composition of Example 8' were almost the same as those of the composition of Example 4' containing an unacetylated ester compound.

In contrast, the composition of Comparative Example 2' with, as a leveling agent, bis(butyldiglycol)adipate containing no hydroxyl groups, the composition of Comparative Example 3' with tributyl citrate containing no ether bonds, the composition of Comparative Example 4' with acetyltributyl citrate containing no ether bonds, and the composition of Comparative Example 5' with texanol containing no ether bonds exhibited a poor leveling property and also had poor gloss generally.

The above results clearly show that also in floor-polish compositions comprising an acrylic polymer emulsion, the ester compounds of the invention obtained by reacting a hydroxycarboxylic acid or acetylated hydroxycarboxylic acid with glycol ether exhibit excellent properties as leveling agents, compared to ester compounds of aliphatic alcohols not having a hydroxyl group.

INDUSTRIAL APPLICABILITY

The leveling agent of the invention can be suitably used as a leveling agent for floor-polish compositions.

The invention claimed is:

1. An aqueous floor-polish composition comprising a water-insoluble polymer and at least one compound selected from the group consisting of ester compounds obtained by reacting a hydroxycarboxylic acid selected from the group consisting of malic acid, lactic acid, and tartaric acid with at least one glycol ether so that all of the carboxyl groups are esterified, acetylated ester compounds obtained by acetylating one or two hydroxyl groups of a hydroxycarboxylic acid selected from the group consisting of malic acid, lactic acid, and tartaric acid and reacting the acetylated compound with at least one glycol ether so that all of the carboxyl groups are esterified and acetylated ester compounds obtained by reacting a hydroxycarboxylic acid selected from the group consisting of malic acid, lactic acid, and tartaric acid with at least one glycol ether so that all of the carboxyl groups are esterified and then acetylating one or two hydroxyl groups of the esterified compound.

2. The composition according to claim 1 wherein the glycol ether is a compound represented by formula (2):

$$R^1O(R^2O)_pH \qquad (2)$$

wherein $R^1$ is a $C_{1-8}$ straight chain or branched alkyl group, or a $C_{6-12}$ aryl group, $R^2$ is a $C_{2-4}$ straight chain or branched alkylene group, and p is an integer from 1 to 4.

3. The composition according to claim 2 wherein the glycol ether is a compound of formula (2) wherein $R^1$ is a $C_{1-4}$ straight chain or branched alkyl group, $R^2$ is a $C_{2-4}$ straight chain or branched alkylene group, and p is an integer from 1 to 4.

4. The composition according to claim 1 containing 0.005 to 20 wt. % of at least one compound selected from the group consisting of the above ester compounds and acetylated ester compounds per 100 wt. % of the composition.

5. The composition according to claim 1 wherein the water-insoluble polymer is at least one polymer selected from the group consisting of polymers derived from ethylenically unsaturated bond-containing monomers, copolymers thereof, and urethane polymers.

6. The composition according to claim 5 wherein the water-insoluble polymer is at least one polymer selected from the group consisting of acrylic polymers, styrene-acrylic polymers, urethane polymers, and urethane-acrylic polymers.

7. The composition according to claim 5 wherein the water-insoluble polymer is at least one polymer selected from the group consisting of styrene-acrylic polymers, and acrylic polymers.

8. The composition according to claim 1 containing 1 to 50 wt. % of the water-insoluble polymer per 100 wt. % of the composition.

9. A method of using an ester compound as a floor-polish leveling agent, the ester compound being obtained by reacting a hydroxycarboxylic acid selected from the group consisting of malic acid, lactic acid, and tartaric acid with at least one glycol ether so that all of the carboxyl groups are esterified, comprising coating the floor-polishing leveling agent on a floor surface.

10. A method of using
   acetylated ester compounds obtained by acetylating one or two hydroxyl groups of a hydroxycarboxylic acid selected from the group consisting of malic acid, lactic acid, and tartaric acid and reacting the acetylated compound with at least one glycol ether so that all of the carboxyl groups are esterified, or acetylated ester compounds obtained by reacting a hydroxycarboxylic acid selected from the group consisting of malic acid, lactic acid, and tartaric acid with at least one glycol ether so that all of the carboxyl groups are esterified and then acetylating one or two hydroxyl groups of the esterified compound as a floor-polish leveling agent, said method comprising coating the floor-polishing leveling agent on a floor surface.

11. A method of producing an aqueous floor-polish composition comprising mixing a water-insoluble polymer-containing component with at least one compound selected from the group consisting of ester compounds obtained by reacting a hydroxycarboxylic acid selected from the group consisting of malic acid, lactic acid, and tartaric acid with at least one glycol ether so that all of the carboxyl groups are esterified,
   acetylated ester compounds obtained by acetylating one or two hydroxyl groups of a hydroxycarboxylic acid selected from the group consisting of malic acid, lactic acid, and tartaric acid and reacting the acetylated compound with at least one glycol ether so that all of the carboxyl groups are esterified and acetylated ester compounds obtained by reacting a hydroxycarboxylic acid selected from the group consisting of malic acid, lactic acid, and tartaric acid with at least one glycol ether so that all of the carboxyl groups are esterified and then acetylating one or two hydroxyl groups of the esterified compound.

12. A method of applying to a floor surface an aqueous composition comprising a water-insoluble polymer and at least one compound selected from the group consisting of ester compounds obtained by reacting a hydroxycarboxylic acid selected from the group consisting of malic acid, lactic acid, and tartaric acid with at least one glycol ether so that all of the carboxyl groups are esterified,
   acetylated ester compounds obtained by acetylating one or two hydroxyl groups of a hydroxycarboxylic acid selected from the group consisting of malic acid, lactic acid, and tartaric acid and reacting the acetylated compound with at least one glycol ether so that all of the carboxyl groups are esterified and acetylated ester compounds obtained by reacting a hydroxycarboxylic acid selected from the group consisting of malic acid, lactic acid, and tartaric acid with at least one glycol ether so that all of the carboxyl groups are esterified and then acetylating one or two hydroxyl groups of the esterified compound.

* * * * *